Jan. 19, 1965   P. SADA   3,166,461
APPARATUS FOR FORMING AND SECURING A SECONDARY
CONTAINER WITHIN A PRIMARY CONTAINER
Filed Sept. 30, 1963   6 Sheets-Sheet 1

Pietro Sada,
INVENTOR.

BY Wenderoth, Lind
and Ponack
attorneys

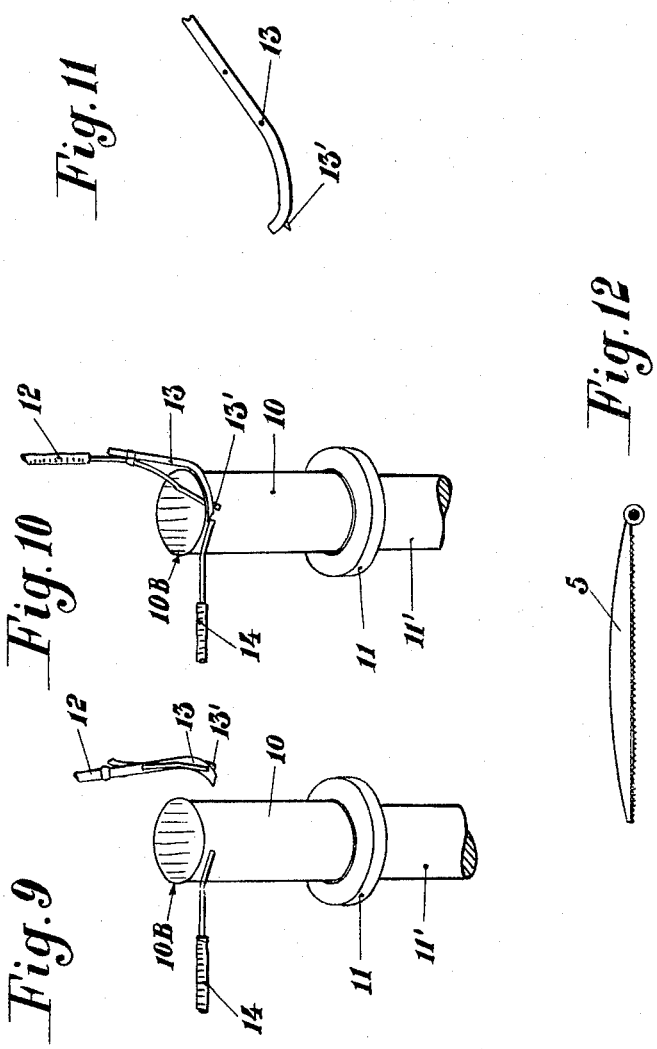

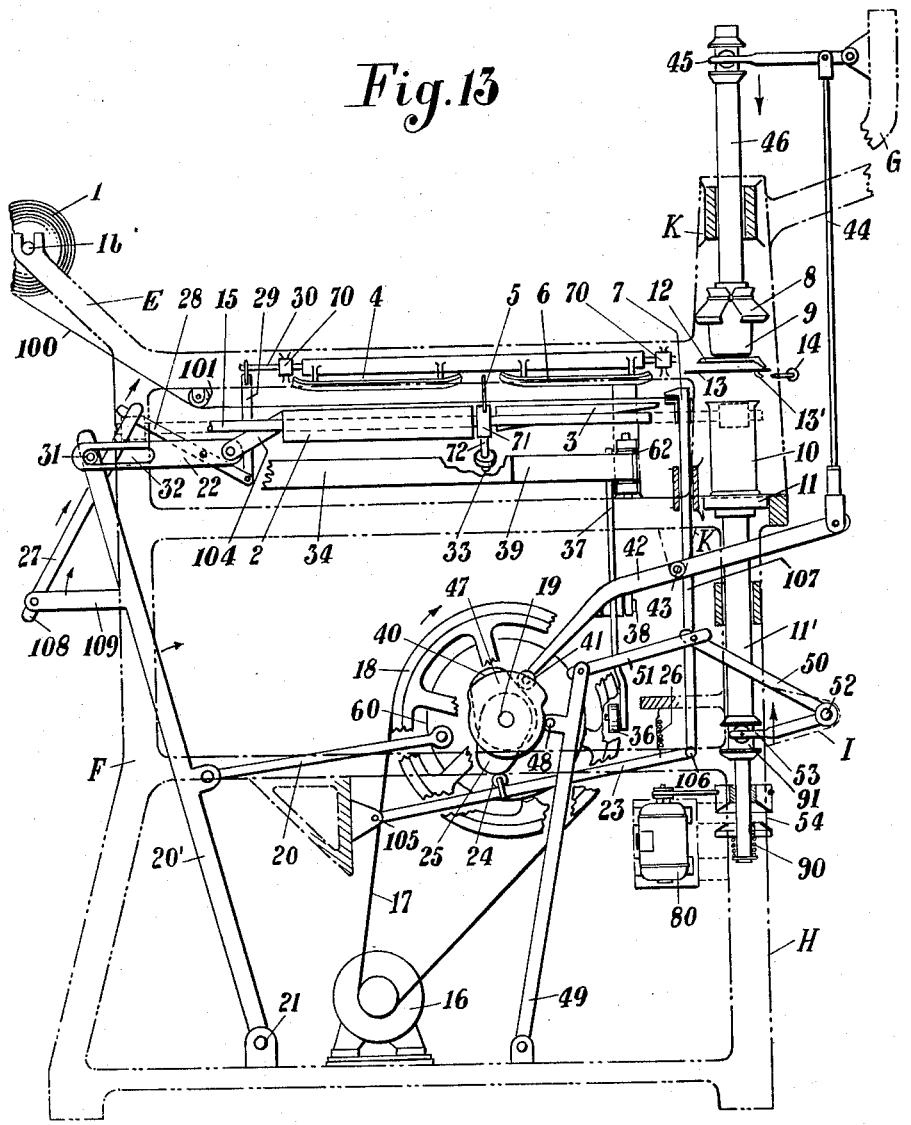

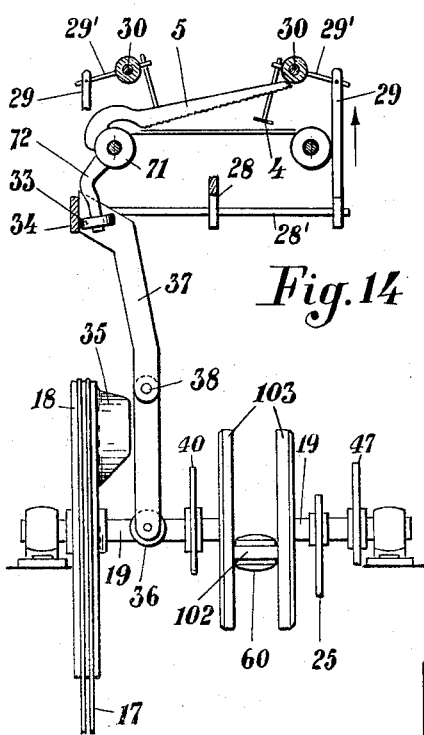

3,166,461
APPARATUS FOR FORMING AND SECURING A SECONDARY CONTAINER WITHIN A PRIMARY CONTAINER
Pietro Sada, Aprilia, Latina, Italy
Filed Sept. 30, 1963, Ser. No. 312,384
Claims priority, application Italy, Dec. 10, 1958,
18,204/58
10 Claims. (Cl. 156—447)

This application is a continuation-in-part of my application Serial No. 791,909, filed February 9, 1959, now abandoned, entitled "Method and Apparatus for Manufacturing Food Containers."

The present invention relates to an apparatus for forming and positioning a secondary container within a primary or main container.

An object of the invention is to provide an apparatus for forming a secondary container from a blank consisting of a thin sheet of plastic material and then drawing such blank into a primary container and securing the same thereto, thus forming a double container.

A further object of the invention is to form a double container whereby certain foodstuffs such as rice, pastes and the like may be maintained separated from other foodstuffs until the time of use.

A further object of the invention is to use a plastic material such as polypropylenic material for the secondary container which has the mechanical strength to withstand a drawing operation and the crimping of the lid to the side wall of the container and which is also heat resistant to withstand temperatures necessary for sterilizing the foods between about 100° C. and 120° C.

A further object of the invention is to provide a machine wherein a roll of plastic material is unwound, then cut into sheets and then drawn into the proper form within the primary container to form the secondary container.

A further object of the invention is to provide means wherein said plastic material is adhered to the edge of the primary container and the excess portions thereof removed.

A still further object of the invention is to provide control means whereby the various instrumentalities such as the feeding of the plastic sheet, the cutting thereof and the drawing means therefor are operated in synchronism and at the same time the primary container is placed in position rotated and moved in cooperation with a punch.

With the above and other objects in view which will become apparent from the detailed description below, a preferred form of the invention is shown in the drawings in which:

FIGURE 9 is a perspective view of a detail illustrating particularly the means for securing the secondary container to the edge of the primary container.

FIGURE 10 is a view similar to FIGURE 9 showing the parts in a different position.

FIGURE 11 is a perspective view of the blade used for the adhering and severing steps.

FIGURE 12 is a side view of the cutting plate.

FIGURE 13 is a side elevational view with parts shown in section and parts broken away illustrating one form of apparatus for carrying out synchronously the various operations illustrated in FIGURES 1 to 6.

FIGURE 14 is a partial side view of a part of the mechanism shown in FIGURE 13 and illustrating particularly the cam shaft and the clamping and cutting means.

FIGURE 15 is a plan view of a portion of the mechanism shown in FIGURE 13 illustrating particularly the means for securing the adherence of the secondary container to the primary container and the means for removing excess plastic material, and FIGURE 16 is an elevational view of the punch with parts in section for forming and clamping the secondary container on the primary container.

Figure 1:
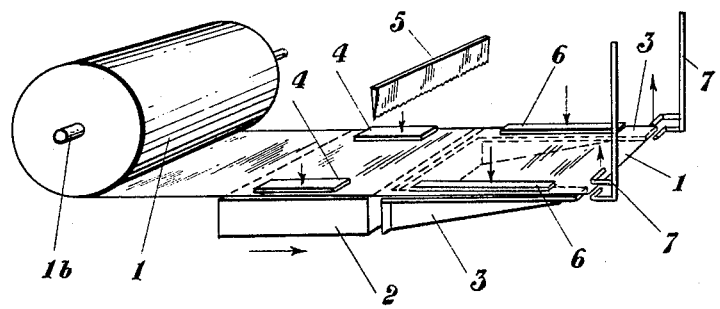
FIGURE 1 is a diagrammatic perspective view illustrating the feeding, crimping, and cutting means at the beginning of an operational cycle.
Figure 2:
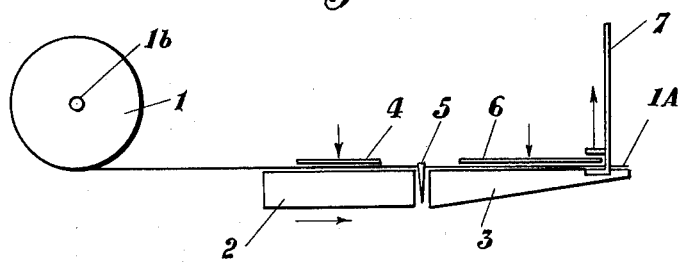
FIGURE 2 is a diagrammatic side view showing particularly the cutting stroke.

FIGURES 1 and 13 show a roll 1 of plastic material wound upon the shaft 1b which in turn is supported by arms E extending from the frame F. The upper ends of the arms E are fork shaped to receive the shaft 1b.

The strip of material 100 passes from the roll 1 under a guiding roller 101 to a reciprocating saddle 2 which is reciprocated on two spaced parallel guide bars 15 which at their ends are supported in the frame F.

Referring to FIGURES 13 and 14, the reciprocation of the saddle 2 is secured by means of an eccentric pin 102 fixed to the spaced plates 103. The pin 102 is encircled by the eye 60 upon one end of the connecting rod 20. The other end of the rod 20 is pivotally connected to a bar 20' at an intermediate point thereof. The lower end of the bar 20' is pivotally connected at 21 to the frame F and the other end is provided with a roller 31 engaging in the slot 32 of a link 22 which is pivoted to an arm 104 fixed to the saddle 2.

The linkage above described is operated by an electric motor 16 mounted on the frame which drives the V-belt 17 which in turn drives the pulley 18 fixed upon a shaft 19 mounted in the frame. The shaft 19, as shown in FIGURE 14, comprises two sections of which one section is secured to one of the plates 103 while the other section is secured to the other plate 103.

The strip 100 initially is advanced on the saddle 2 until it reaches the fork shaped grippers 7 which will fasten the edge of such strip to U-shaped guide support 3 which forms an extension of the saddle 2. The grippers 7 are operated by means of a lever 23 which is pivoted at one end 105 to the frame and at the other end to the center of a transverse bar 106. The ends of the transverse bar 106 are pivoted to the lower ends of spaced bars 107 which in turn are connected to the grippers 7 which cooperate with the legs of the U-shaped extension 3 to clamp the strip 100 thereon. The movement of the lever 23 is secured by means of a roller 24 cooperating with the cam 25 mounted upon the shaft 19. The roller 24 is maintained in contact with said cam by means of the spring 26 secured at one end to the frame and at its other end to the bar 23.

The strip 100 will also be clamped on to the saddle 2 and the extension 3 by means of the clamps 4, 4 which cooperate with the strip 100 which is upon the saddle 2 and the clamps 6, 6 which cooperate with the U-shaped extension 3. The operation of the clamps 4, 4 and 6, 6 is secured by a link 27 pivotally connected at 108 to an extension 109 upon the rod 20'. The other end of the link 27 is pivotally connected to a rod 28 which in turn is pivotally mounted at an intermediate point upon the link 22. The other end of the rod 28 is pivotally connected to a transverse rod 28' which in turn is connected at its ends to a pair of rods 29 which actuate the levers 29' for rotating the clamping members 4, 4 and 6, 6 to clamping and unclamping position.

The clamp bars 30 which carry the clamps are rotatably mounted by the bars 70 in the machine frame.

The oscillation motion of the bar 20' operating through the likage 27, 28, 29 and 29' will set the clamps 4, 4 and 6, 6 which are rigidly fixed on the clamp bars 30, 30 into clamping and unclamping position upon the strip 100. The clamping action will correspond to the stroke of the roller 31 in the slot 32 of the link 22 so that the saddle 2 and the extension 3 will remain at a standstill until the roller 31 reaches the end of the slot 32. On one of the guide bars 15 between the saddle 2 and the extension support 3 a knife 5 is mounted. The knife 5 is fixed to a ring 71 slidable upon the bar 15 and the ring 71 has fixed thereto a lever 72 carrying a roller 33 which cooperates with a plate 34. The ring 71 will be moved reciprocally upon the guide bar 15 by the movement of the saddle 2 and the extension 3.

Figure 3:
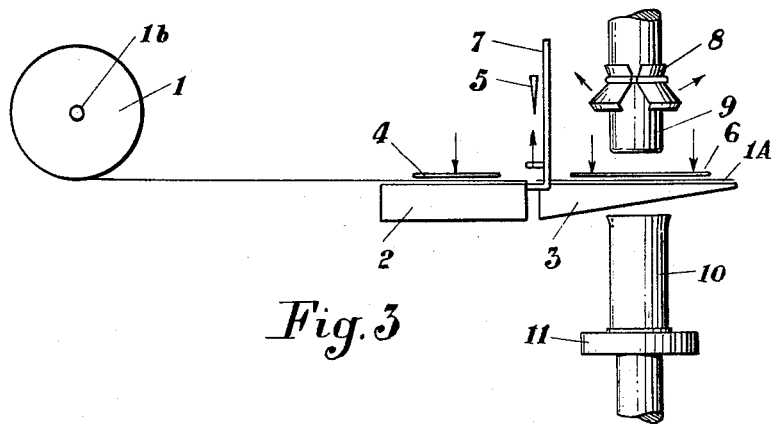
FIGURE 3 is a similar view illustrating the positioning of a cut sheet of plastic material between the drawing plunger and the primary container.

The operation of the knife 5 to sever a section of the strip 100 is secured by means of a cam 35 fixed at one side of the pulley 18 which cooperates in turn with a roller 36 upon a lever 37 pivoted to the frame at an intermediate point by a pivot 38. The lever 37 at its upper end is secured to a plate 39 which is a prolongation of the guiding plate 34 and is hinged thereto. The plate 39 is elastically pivoted in the frame and is returned to normal position by means of a return torsion spring 62. The cam 35 on the pulley 18 is so synchronized with respect to the eccentric 60 that when the roller 33 reaches the free end of the hinged plate 39 the roller 36 will be operated by the cam 35 and thereby operate the lever 37 to oscillate the plate 39 outwardly thereby allowing the knife 5 to fall and cut the strip 100. When the roller 36 is removed from the action of the cam 35 the torsion spring 62 will bring about a return of the knife and lift it to inoperative position. The saddle 2 and the guide support 3 continue their movement until the cut portion of the strip 100 is placed above a primary container 10 as shown in FIGURE 3. The clamps 4, 4 and 6, 6 have been lowered before the finishing stroke of the saddle 2 and the guide support 3 and will therefore maintain the strip and also its severed portion fixed on the saddle and guide support.

A primary container 10 is positioned on a platform 11 which is fixed to a shaft 11' which in turn is rotatably and slidably mounted in a vertical post H of the frame F. A rotary motion is transmitted to the shaft 11' by an electrical motor 80 and a disengageable friction clutch 54.

The sliding motion of the shaft 11' is obtained by means of a cam 47 mounted upon the shaft 19 cooperating with a follower 48 fixed to an arm 49 pivoted at its lower end to the frame. The upper end of the arm 49 is pivotally connected to a rod 51 which in turn at its other end is pivotally connected to a bell lever 50 pivoted to a projection I upon the frame F. The other end of the bell crank lever 50 is fork-shaped and cooperates with a yoke 91 which is rotatably mounted on the shaft 11'. Therefore when the cam 47 urges the rod 49 to the right as shown in FIGURE 13 the bell crank lever 50 will slide the shaft 11' upwardly and thereby engage the clutch 54 against the action of the spiral spring 90. The shaft 11' will therefore rotate until the rod 49 swings to the left when the spring 90 will disengage the clutch 54 thereby interrupting rotation of the shaft 11'.

Located above the primary container 10 there is provided a post K in which a punch stem 46 is slidably arranged. The stem 46 at its lower end is provided with a drawing punch 9 as shown in FIGURE 16 having four claws 8 peripherally arranged and pivotally mounted on the punch 9.

The sliding movement of the punch stem 46 is secured by a cam 40 also fixed to the shaft 19 which cooperates with a follower 41 upon a lever 42 pivotally mounted at an intermediate point 43 to the frame projection K and which is pivotally connected at its other end to a tie rod 44 which in turn is pivotally connected at its other end to an intermediate point of a lever 45. One end of the lever 45 is pivotally mounted upon a projection G of the frame whereas the other is fork shaped and is pivotally connected to the upper end of the punch stem 46. Thus as the follower 41 is moved upwardly by the cam 40 the lever 42 will pull the tie-rod 44 downwardly and thereby by means of the lever 45 lower the punch stem 46. The return movement of the punch stem is secured due to the fact that the weight of the left hand portion of the lever 42 as shown in FIGURE 13 is greater than than that of the linkages 44, 45, 46 and that portion of the lever 42 to the right of the pivotal point 43.

Figure 4:
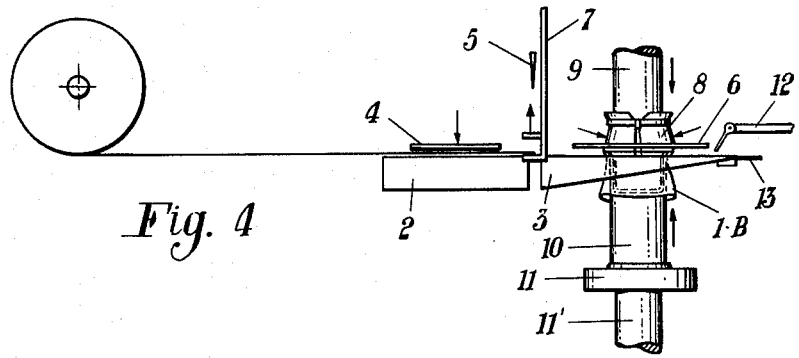
FIGURE 4 is a diagrammatic side view illustrating particularly the drawing step.

When the follower 48 is moved to the right as shown in FIGURE 13 the shaft 11' will be raised together with the primary container 10 on the platform 11 thereby engaging the friction clutch 54 to rotate the container 10. Almost simultaneously the punch 9 will be lowered into the primary container pointing to the cooperation of the follower 41 with the cam 40 thus drawing the severed portion of the plastic material into the container 10 to form the secondary container. The operative length of the eccentric portion upon the cam 47 is so selected with respect to the speed of rotation of the motor 80 so as to rotate the shaft 11' through an angle of 540°, corresponding to one and a half turns of the container 10. During the lowering movement of the punch 9 the claws 8 are in their raised position, that is spaced apart from the body of the punch 9. Upon its downward stroke the punch 9 starts the drawing operation as shown in FIGURE 4 and completes such operation while the claws 8 move towards the punch body thereby clasping peripherally the severed portion 1A against the container 10 just below its edge as shown at 10B in FIGURES 6 and 8.

The movement of the claws 8 is controlled by the simultaneous movement in the opposite direction of the container 10 which pushes upwardly the punch 9 which in turn slides on the stem 46 for a short stroke provided therein and a conical portion of the stem 46 causes the claws 8 to clasp the portion 10B around the outer marginal surface of the container 10. Immediately after this operation the shaft 11' is rotated by the motor 80 and the support guide 3 initiates together with the saddle 2 which is rigidly connected therewith, the return movement and the clamps 4, 4 and 6, 6 are now disengaged and the grippers 7 retain the leading edge of the strip preventing escape of the same.

At one side of the guide support 3 there is provided an inclined sliding plane 55 for operating the adhering means. The adhering means are provided for securing the secondary container to the primary container and comprises an arcuated cutting blade 13 having a lower extension or lug 13'. A movable blow pipe 12 moves together with the blade 13 and a stationary blow pipe 14 is fixed to the frame F, see FIG. 15.

Figure 5:
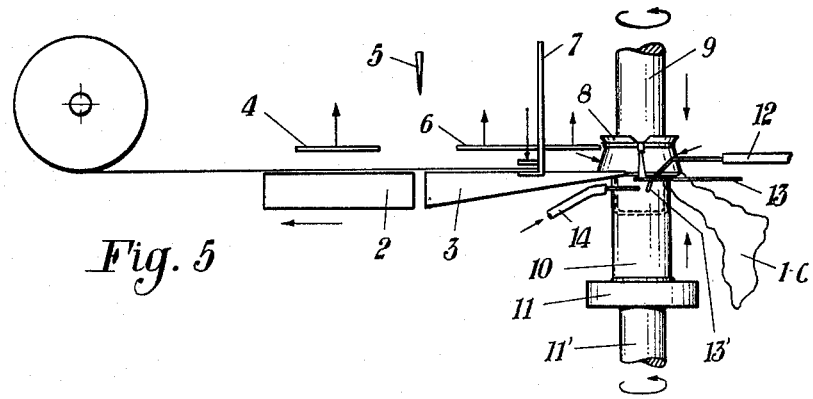
FIGURE 5 is a similar view showing the adhering step and the severing of excess material from the secondary container.

As illustrated in FIGURE 5, during the adhering step the two blow pipes 12 and 14 which are provided with gas-supplied frame nozzles, heat the blade 13 and its lug 13'.

As soon as the drawing step has been completed and the excess portion of the sheet has been clamped against the container body, the clamps 4, 4 and 6, 6 are raised thus freeing the strip 100 while the two gripping end prongs of the grippers 7 are carried against one another so as to grip the front end of the strip located on the movable saddle thus preventing such strip and form being carried back towards the roll 1.

In the meantime, the saddle 2 which is connected to the guide support 3 starts moving backwardly towards the roll 1. During this movement the inclined plane 55 causes a follower 56, see FIGURE 15, to mount thereon thus causing the blade 13 to oscillate around a pivot 56' while the blade 13 is pivoted to the frame. The blade, together with the blow pipe 12 will therefore move towards the primary container 10 unitl resting against it just under the edge 10B. The scraping action of the sharp cutting edge of the blade 13 which has been rendered incandescent from the frame from the blow pipe 12 on the lateral surface of the primary container 10 causes a very thin peripheral zone of the sheet 1A to be fused and burnt thus adhering at its margin to the surface of the container 10 underlying the edge 10B. The lug 13' thereby removes owing to the rotational movement of the container 10 the excess portion of the strip 1C, see FIGURE 5 from the portion adhering to the primary container 10. The lug is heated as indicated above by the frame from the blow pipe 14.

Figure 6:
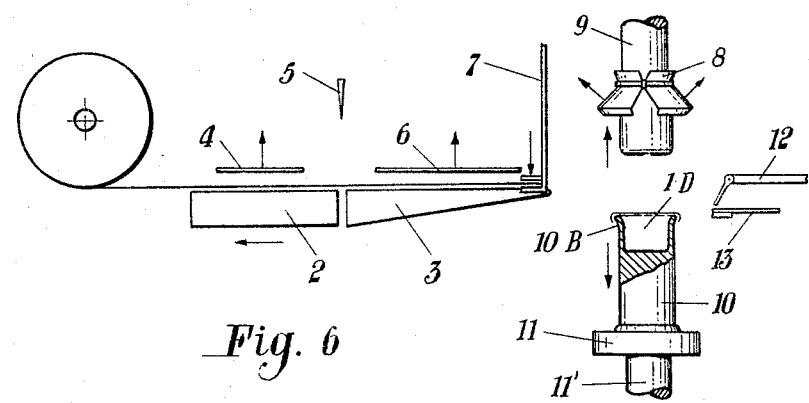
FIGURE 6 is a similar view showing the completion of the formation of the secondary container within the primary container with the parts returned to their original position for the beginning of the operational cycle as shown in FIGURE 1.

After the adhered portion of the sheet has been cut and the excess portion 1C removed the operations occur as shown in FIGURE 6 wherein the blade 13 with its lug 13' and the blow pipe 12 move back to their normal position, the claws 8 open thus freeing the container 10 while the platform 11 is lowered by the shaft 11' so that the container 10 may be carried away for the following filling step of the secondary container 1D while another primary container is placed on the platform 11.

Meanwhile the punch 9 is raised to its initial position and the movable saddle 2 and the guide support 3 reach the end of their stroke. At this instant the grippers 7 operate while the clamps 4, 4 and 6, 6 again clamp the strip 100 and the apparatus is ready to start a new operational cycle on a second container 10.

Figure 7:
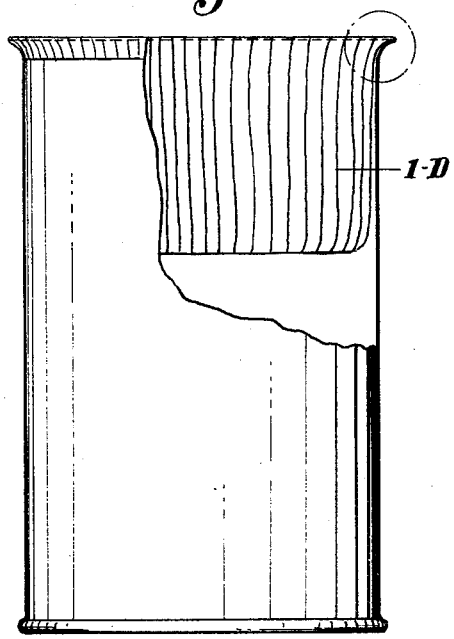
FIGURE 7 is an elevational view with parts broken away showing the primary container with the secondary container therein.
Figure 8:
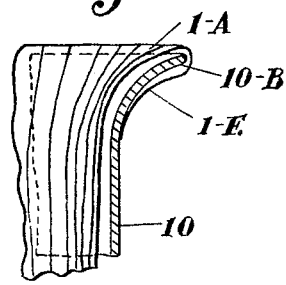
FIGURE 8 is a fragmentary sectional view upon an enlarged scale of the edge of the container shown in FIGURE 7.

FIGURES 7 and 8 show the formation of the two containers with respect to one another as well as the adhesion zone 10B. These figures illustrate the advanced product obtained by the present apparatus.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. An apparatus for forming and securing a secondary container of plastic material in a primary container, comprising a frame, a shaft rotatably mounted in said frame, a pulley fixed to said shaft, a motor for rotating said pulley, a series of cams fixed to said shaft comprising a first, second, third and fourth cam, an eccentric dividing said shaft in two sections forming an integral unit therewith, feeding means on said frame for feeding a strip of plastic material, a first linkage system operatively connected to said eccentric and feeding means, cutting means pivoted on said feeding means for cutting a sheet from said strip operated by said first cam, gripping means on said frame for gripping said cut sheet, a first lever system connected to said gripping means cooperating with said second cam, punch means slidably mounted vertically in said frame for drawing said sheet into a primary container, support means slidably and rotatably arranged in said frame beneath said punch means for supporting said primary container, a second linkage system operatively connected to said frame and support means cooperating with said third cam, a third lever system operatively connected with said punching means and cooperating with said fourth cam, adhering means pivotally mounted on said frame cooperating with said feeding means for adhering said secondary container to said primary container and heating means operatively connected to said adhering means for heating said adhering means.

2. An apparatus as claimed in claim 1, wherein said feeding means comprises two spaced parallel slide bars supported at both ends on said frame, a saddle slidably mounted on said slide bars, a guide support slidably mounted on said slide bars, two spaced parallel clamp bars supported on said frame above said slide bars, a clamp rotatably mounted on each one of said clamp bars above said saddle and a clamp rotatably secured to each one of said clamp bars above said guide support.

3. An apparatus as claimed in claim 2, wherein said first linkage system comprises a first connecting rod pivoted at one end to said eccentric, a second connecting rod pivoted at one end to said frame, the other end of said first connecting rod being pivoted at an intermediate point of said second connecting rod, a slotted link pivoted at its slotted end to said second connecting rod and at the other end to said saddle, a third connecting rod pivoted at one end to said second connecting rod extending in oppoiste direction to said first connecting rod, a fourth connecting rod pivoted at an intermediate point to said slotted link and at one end to said third connecting rod, a transverse bar pivoted at its middle point to said fourth connecting rod, two tie bars each pivoted at one end respectively to a corresponding end of said transverse bar, two levers pivoted at an intermediate point onto said clamp bars respectively and pivoted at one end to the other end of said tie bars respectively, the other ends of said levers being rigidly connected to said clamps respectively, whereby the rotative motion of said pulley will be transformed by said first linkage system to a reciprocating motion of said saddle and in a downward motion of said clamps before initiating the feeding stroke of the saddle and an upward motion before the return stroke of the saddle.

4. An apparatus as claimed in claim 2, wherein said cutting means comprises a knife pivoted to one of said slide bars between said saddle and guide support and having a lower projection extending downwardly, a roller rotatably mounted on the end of said projection, a guide supported on said frame beneath said slide bar, said guide consisting of a stationary portion and a movable portion, said stationary portion being rigidly fixed at one end to said frame and said movable portion elastically pivoted at one end to a vertical post of said frame and abutting at the other end on the other end of said stationary guide portion, a lever pivoted at an intermediate point to said frame and rigidly secured at one end to said movable portion of said guide, a roller rotatably mounted on the other end of said lever and cooperating with said first cam whereby said movable portion is moved causing said knife to fall and sever said strip.

5. An apparatus as claimed in claim 1, wherein said gripping means comprises two grippers slidably arranged in said frame and said first lever system comprises two parallel rods rigidly connected at one end with said grippers respectively, a lever pivoted at one end to said frame, a roller pivoted to an intermediate point of said lever and cooperating with said second cam, a return spring fixed to said frame and to said lever, a transverse rod pivotally fixed at its middle point to the other end of said lever, the other ends of said parallel rods being pivoted to the ends of said transverse rod respectively, whereby the rotative motion of said second cam will be transformed into a downward and upward motion of said grippers for gripping and feeding the plastic strip.

6. An apparatus as claimed in claim 1, wherein said support means for the primary container comprises a support shaft, a platform rigidly fixed on the upper end thereof and a yoke rotatably mounted on said shaft and said second linkage system comprises a crank rod pivoted at one end to said frame, a follower rotatably arranged at an intermediate point of said crank rod cooperating with said third cam, a connecting bar pivoted at one end to the other end of said crank rod, a bellcrank lever pivoted at one end to the other end of said connecting bar and pivoted at its other end to said yoke on said support shaft and means for rotating said support shaft.

7. An apparatus as claimed in claim 6, wherein said means for rotating said support shaft comprises an electrical motor supported by said frame and a friction clutch mounted on said shaft and actuated by said motor and spring means to disengage said friction clutch.

8. An apparatus as claimed in claim 1, wherein said punch means comprises a punch stem slidable in said frame, a punch slidable on the lower portion of said punch stem, four arcuated claws pivoted to said punch around the upper end thereof, the central bore of said punch having a conical upper widening portion corresponding to a conical flaring portion of said punch stem for allowing said claws to clasp the plastic sheet against the outer cylindrical surface of said primary container after the drawing operation of said secondary contained and said third lever system comprises a first lever pivoted at an intermediate point to said frame, a tie rod pivoted at one end to said first lever, a second lever pivoted at one end to the frame and pivoted at the other end to the upper end of said punch stem, a follower arranged at the other end of said first lever and cooperating with said fourth cam, whereby said fourth cam causes said first lever to pull down said punch for drawing the secondary container into said primary container.

9. An apparatus as claimed in claim 1, wherein said adhering means comprises a cutting blade pivoted to the frame laterally of said primary container and having a lug, a follower arranged at one end of said blade and cooperating with a side cam projection of the guide support to oscillate the other arcuated end of said blade under the edge of said primary container and said heating means comprises a blow pipe movable together with said blade for heating the arcuated cutting end thereof, and a stationary blow pipe rigidly secured to the frame to heat the lug of said blade, whereby said blade cuts the excess portion of the secondary container folded over the primary container and said lug removes said excess portion cut by said blade.

10. A device for drawing secondary containers made of plastic material into primary containers comprising in combination means for rotatably supporting a roll of plastic material in ribbon form, a movable saddle located underneath said roll, guide supports rigidly connected with said saddle, said saddle and said guide supports having a movement to and from said roll, said saddle and said guide supports being in end-to-end spaced position with respect to each other and leaving a space therebetween, said saddle and said guide supports receiving thereon a part of said ribbon unrolled from said roll, means for fastening said part on said saddle and guide supports, the end portion of said unrolled part resting on said guide supports and having the outer edge flush with and fixed to the fore end of the guide supports, cutting means located above said saddle and guide supports at the space between said saddle and said guide supports, said cutting means being operatively connected to said saddle and guide supports for cutting the end portion of the ribbon located on said guide supports and for severing the said end portion from the part of the ribbon located on said saddle, the end portion of the ribbon located on the guide supports and severed from the ribbon laying on the saddle having dimensions adapted to form a secondary container therefrom, supporting means for a primary container, means for vertically moving and rotating said supporting means with said primary container a turn and one half, said primary container being located underneath said end portion of the plastic ribbon, punch means arranged above said end portion of the plastic ribbon, said punch means being coaxial with said primary container and being vertically movable for drawing said end part of said plastic ribbon into said primary container thus forming a secondary container therein, said secondary container having a wall with an excess upper portion, claw means hingedly mounted on the outer surface of the punch means and arranged to fold over the upper excess part of said secondary container outside of the upper edge of said primary container and to clasp on the upper edge of the primary container, heating means to partially fuse the excess portion of said secondary container which has been folded over and to cause the folded portion to adhere to said primary container in an adhesion zone below the upper edge of the primary container, cutting means operatively associated with said heating means, said cutting means being heated by said heating means and being arranged for cutting and removing the end portion of the folded material of the secondary container underneath said adhesion zone below the edge of said primary container.

References Cited by the Examiner
UNITED STATES PATENTS

| | | | |
|---|---|---|---|
| 1,885,607 | 11/32 | Knox | 156—293 |
| 2,328,798 | 9/43 | Gardner | 156—160 |
| 2,484,336 | 10/49 | Epstein et al. | 156—478 |
| 2,569,534 | 10/51 | Netz | 156—478 |
| 2,693,618 | 11/54 | Pfeiffer | 264—292 XR |
| 2,736,065 | 2/56 | Wilcox | 156—160 XR |
| 2,910,397 | 10/59 | Husum et al. | 156—293 |

EARL M. BERGERT, *Primary Examiner.*